C. J. JUNGERS.
PROCESS FOR MAKING WIRE GLASS.
APPLICATION FILED MAY 27, 1909.
938,385.
Patented Oct. 26, 1909.
2 SHEETS—SHEET 1.
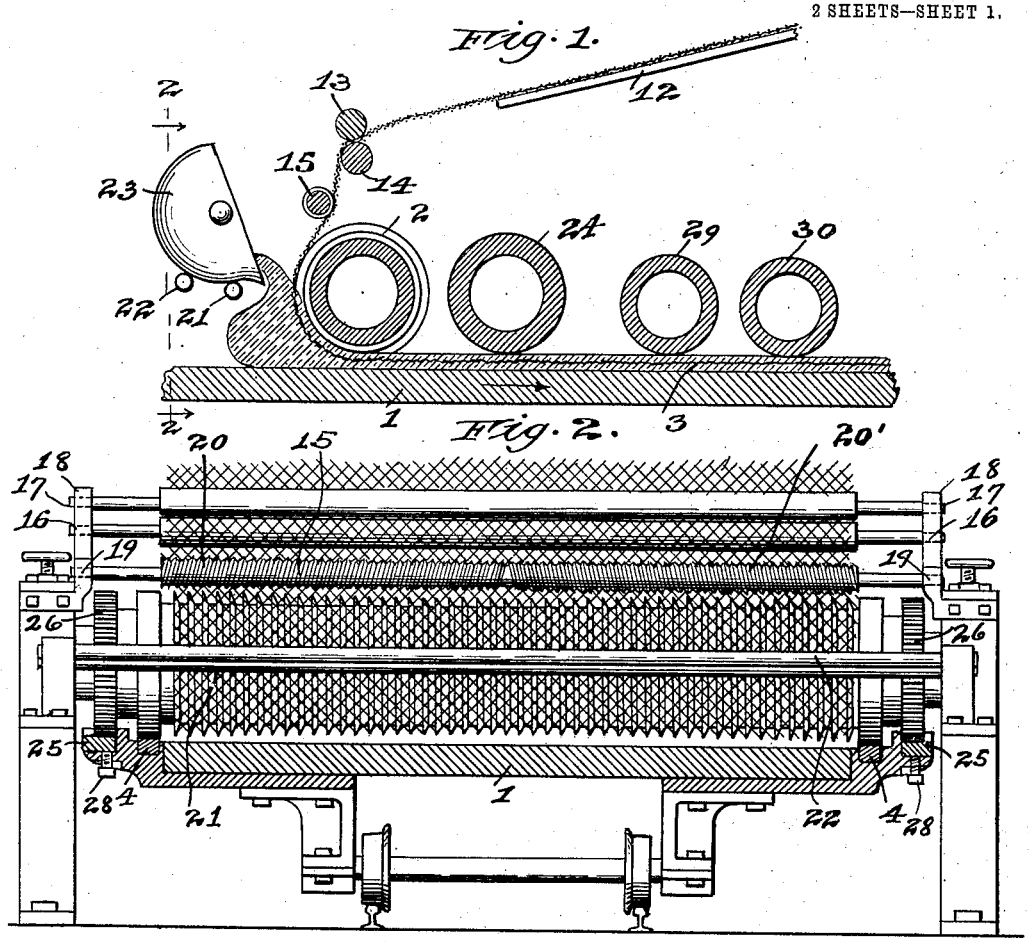
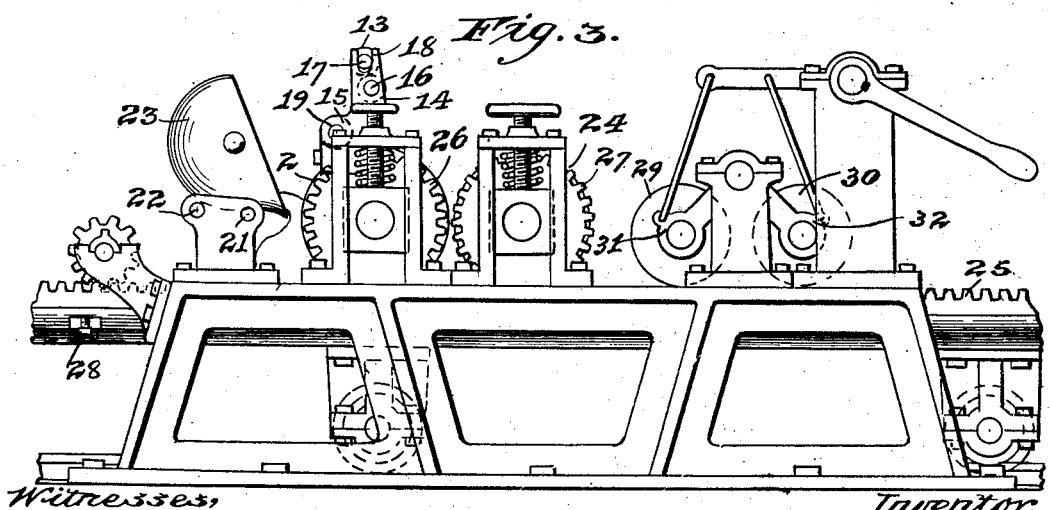

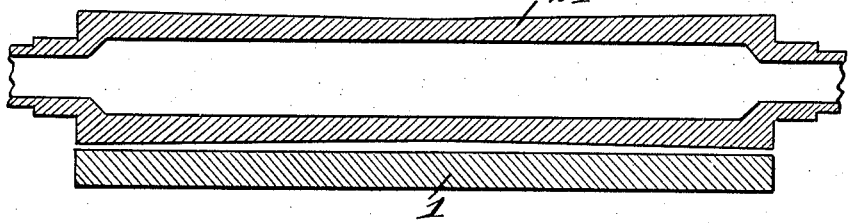
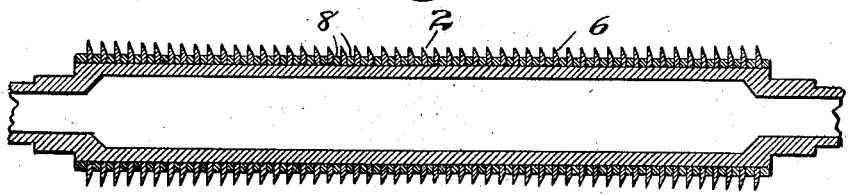
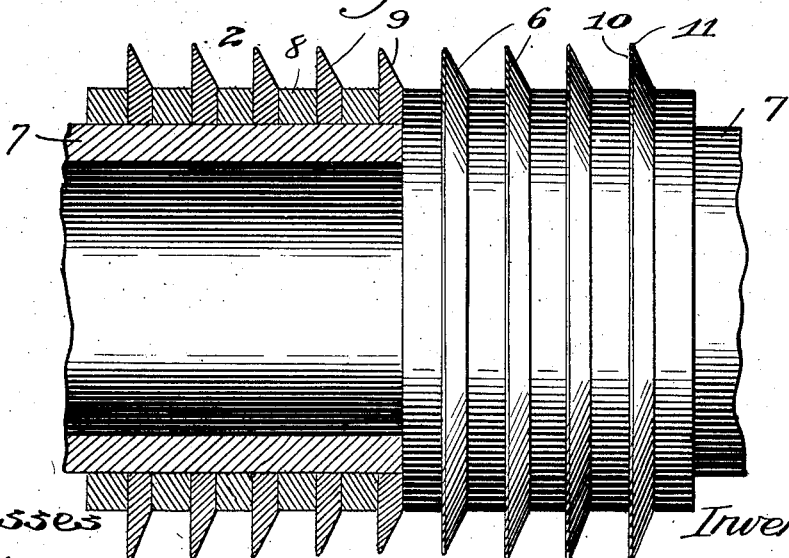

UNITED STATES PATENT OFFICE.

CLEMENT J. JUNGERS, OF STREATOR, ILLINOIS.

PROCESS FOR MAKING WIRE-GLASS.

938,385.  Specification of Letters Patent.  Patented Oct. 26, 1909.

Application filed May 27, 1909. Serial No. 498,647.

*To all whom it may concern:*

Be it known that I, CLEMENT J. JUNGERS, a citizen of the United States, residing at Streator, in the county of Lasalle and State of Illinois, have invented certain new and useful Improvements in Processes for Making Wire-Glass, of which the following is a specification.

This invention relates to an improved process for making wire glass.

Among the main objects of the invention are to provide a process whereby so-called wire glass may be made by a novel single-pour method and whereby a new product will result which will be free from the objectionable characteristics heretofore inherent to wire glass made by any of the single-pour processes heretofore known, and as contra-distinguished from such earlier products will be smooth-surfaced, clear, brilliant, of uniform undistorted formation, and will have the wire fabric placed therein so accurately and uniformly that the product will be entirely suitable for polishing and for other purposes to which high grade wire glass is adapted; to lessen the operations, the time of operations and the number of persons employed in performing such operations in rolling out the glass, thereby very materially economizing in cost; and to produce an article which while being fully the equal of the best so-called sandwich glass as regards uniformity of structure, clearness, brilliancy, etc., is at the same time made from a single casting or pour of glass rolled out as a single sheet, and therefore possesses greater uniformity of texture throughout than is possible where, as in the sandwich processes, the completed sheet is formed of two separately poured and separate rolled half sheets superposed and welded together.

The invention consists in the matters hereinafter described, and more particularly pointed out in the appended claims.

The invention will be readily understood from the following description, reference being had to the accompanying drawings forming a part thereof, and in which is illustrated suitable and novel apparatus for carrying out the process.

In said drawings—Figure 1 is a longitudinal vertical sectional view of the casting bed, the forming rolls and feeding devices of an apparatus adapted to carry out the invention; Fig. 2 is a cross sectional view on line 2—2 of Fig. 1 looking in the direction of the arrows; Fig. 3 is a side elevation of the parts shown in Fig. 1; Fig. 4 is an axial sectional view of one of the forming rolls and a cross sectional view of the casting bed beneath the roll, intended to show the relation between these two parts and the concavity of the roll exaggerated; Fig. 5 is an axial sectional view of the embedding roll; Fig. 6 a detail, partly in axial section and partly in side elevation, of the roll shown in Fig. 5 but on a larger scale.

A method of making wire glass in accordance with a single-pour process heretofore widely used, and the defects inherent to glass made by such method, are set forth with substantial accuracy in Reissue Patent No. 12,443, issued January 30, 1906, to the administrator of E. C. Schmertz, deceased, said description being found immediately following the statement of invention of that patent.

Modifications of the single-pour method above referred to have been tried, but without obviating these defects, so that at the present time it is understood that the defects referred to exist in all single-pour processes and single-sheet structure wire glass.

The Schmertz reissue, above referred to, describes as the subject matter of that patent a process of making wire glass by one of the so-called sandwich processes. Various modifications of the sandwich process are in successful use today. Wire glass of the highest quality is now being largely made substantially in accordance with my previous Letters Patent No. 867,510, dated October 1, 1907; this being one of the so-called sandwich processes.

In accordance with my present invention, I depart from the sandwich process or method, which is now generally understood as being the only process whereby a polishable glass, a glass having a smooth and brilliant surface capable of being readily cut, and whereby sheets of any considerable length and width can be produced, and reverting back to the single-pour method, I have so changed and improved such single-pour method as to produce wire glass not inferior to that which is produced by the best sandwich processes of the present day, and in some respects at least superior.

Among the difficulties which have prevented the successful making of polishable and other high grades of wire glass by the single-pour process are the following: the distortion of the wire mesh and uneven placing of it in the finished product; the scarring of the surface during the introduction of the wire and failure of the following or finishing roll to eliminate these scars; the abnormal chilling and hardening of the surface of the glass rendering it very difficult if not impossible to cut; the roughness or unevenness due to uneven placing of the wire appearing upon the surface of the glass, this defect being so pronounced that the glass, as stated in said patent above referred to, has become known as "caramel glass"; the presence of a serious amount of bubbles in the finished product; the presence of streaks visible in the body of the glass in the finished product; the limitation as to the size of sheets which it was practicable to make under the old single-pour processes; the presence of small cracks, crizzles or fire-checks in the bottom surface of the glass; and an undulatory or uneven placing of the wire mesh in the finished product, leaving parts of the wire so close to one surface or the other that polishing was impracticable.

I have discovered that there have been at least two distinct and important reasons for the defective character of the so-called single-pour process glass heretofore produced. In the first place the wire mesh which is employed is a comparatively loosely woven fabric, woven in different widths and so used for the different widths of glass. The fabric has considerable elasticity and inevitably stretches under the action of embedding it in the glass, but the edges of the fabric are decidedly less elastic than the central portions. Heretofore in the carrying out of the single-pour processes there has been no proper or sufficient control of the feeding in of the wire netting, and as a result the wire netting has not been, even initially, placed in a substantially undeviating plane at a uniform depth from the surface of the glass. Secondly, it has always been believed essential to follow the embedding roller with a smoothing roller arranged to re-roll the sheet of glass with a view of closing and smoothing out the openings or cuts formed by the embedded flanges and by the meshes of the wire. Such re-rolling is not in itself necessarily an improper step, though I have discovered that it may sometimes be dispensed with, but as heretofore performed it has been so carried out as to make the production of good wire glass impossible. That is to say, I have discovered how to subject the sheet of glass after the wire has been inset to a rolling-pressing step without harmful effect upon the sheet whereas, as will hereinafter be more fully pointed out, this smoothing step has heretofore been so performed that it practically re-formed the sheet and in so doing displaced and usually more or less distorted the netting.

The precise nature of my present invention will be best understood by a description thereof as practiced.

In carrying out my present process, I prefer to employ an ordinary casting bed or table 1, which is preferably water-cooled, and which bed may be either stationary, with the roll or rolls arranged to travel while the roll or rolls are held against bodily traversing movement in a suitable frame in which they are journaled.

My present process involves the introduction of the wire into a single-sheet structure by the use of a roller provided with embedding flanges which press the wire into the glass to the requisite depth, and in this respect my process resembles the old methods. Heretofore, however, it has always been thought essential to employ a following smoothing roller to close the cuts or openings made by the embedding flanges and by the meshes of the wire. I have discovered that by complying with certain conditions, and employing certain manipulations, the sheet of glass can be spread, the wire introduced and properly placed therein, and the cuts or openings closed to make a complete commercial sheet of glass, all by the use of a single roll and as a single operation. That is to say, a salient feature of my present invention is the initial formation of a sheet of glass of the full finished thickness, within which is accurately placed in a substantially undeviating plane the sheet of wire netting, and this sheet once formed and inset with the wire netting is thereafter not substantially re-formed or its mass redistributed or tortured to any substantial effect. In case of making thick glass, say from three-eighths inch upward, such as is commonly used for polishing, I can, in accordance with my present method, form the sheet complete and finished with the single roll which serves both to spread the sheet and embed the netting. In such case the glass will as to its inset surface be slightly uneven, showing shallow valleys or undulations defining the paths of the embedding flanges, but the surface will be so smooth that the subsequent polishing will readily dress away the unevenness, or the glass can be used nicely, and readily cut, without any subsequent treatment whatever. However, where the glass is made thin, say one-fourth inch or thereabout, or if the glass is to be finished with a very smooth or uniform inset surface, I follow the embedding and spreading roll with a smoothing roll, but I employ for this purpose a roll or rolls of such character, and I so perform this smoothing step, as to entirely avoid those objections which have been very serious if not fatal defects to the making of high class wire glass in accordance with the older processes.

Referring again to the drawing, 2 designates the combined spreading and embedding roll, which is supported at such height above the bed of the table as to spread the glass out into a sheet 3 of approximately the same thickness it will have as a finished sheet. The roll 2 may be arranged to travel on trangs 4, or it may be provided with collars or ribs in place of the trangs, both of which are well-known expedients. In either event the lower periphery of the main body of the roll, disregarding the embedding flanges, is supported parallel with and above the table at a distance slightly greater than the thickness of the finished sheet. That is to say, the embedding flanges of necessity have substantial thickness and in entering the glass displace the latter upwardly or toward the axis of the roll, and thus upwardly displaced glass subsequently flows back and fills the cuts formed by the embedding flanges, so that the mean thickness of the sheet will be slightly less than the distance between the periphery of the body of the roll and the table.

As shown more particularly in Figs. 5 and 6, the embedding flanges of the preferred construction shown are formed as disks 6 which are detachably mounted upon an inner roll body or core 7, and spaced apart at regular distances by means of removable collars 8, the outer surfaces of which collars constitute spreading surfaces which form the sheet. These disks 6 and the spacing collars 8 are either formed of some dense fine-grained metal, such as steel or fine iron, or else, if formed of coarser metal, may be plated with nickel or other suitable metal, which will afford a smooth, dense surface upon the acting edges of the disks and spreading surfaces of the collars. Furthermore, in the preferred construction shown, the edges of these disks are beveled practically all at one side, as indicated at 9, while the opposed side 10 of each disk is perpendicular to the axis of the roll; the edge proper 11 being moderately sharp but still sufficiently rounded so as not to indent or disfigure the wire mesh. If the embedding or insetting of the wire be performed by the leading or spreading roll, it is essential that the radial depth of these flanges be determined and made to conform to the thickness of glass which is to be rolled. In other words, each different thickness of glass requires a different radial flange depth. Furthermore, it is important that these flanges be properly spaced apart, so that there is on the one hand ample space between the flanges to permit the glass to fully enter and pass through the spaces without any substantial tendency to cling to the rear side of the roll as the latter revolves, or to push ahead of the roll. On the other hand, the flanges must be spaced sufficiently close to inset the wire without leaving it in undulations. Obviously the thinner the flanges are the better, so far as their action upon the glass is concerned, but on the other hand it must be taken into account that the flanges must have substantial thickness or mass in order that they shall not become overheated during their progress through the glass, because whenever the metal becomes overheated the glass sticks to it, and this results in the sheet being drawn up wave-fashion in rear of the embedding roll. I have found flanges of one-eighth inch thickness at the base to give good results, and I prefer to space them about one-half inch apart for thin glass, and about double this distance for one-half inch or heavy glass.

The importance of using embedding flanges having suitably dense and smooth surfaces is a matter which has heretofore not been appreciated or understood. I have discovered that the streaks defining the paths of the embedding flanges in the finished glass are usually entirely due to the use of improper flanges. Of course, if the flanges are not kept scrupulously clean they will produce streaks regardless of their quality, but assuming the embedding flanges to be clean, still in the art as heretofore practiced the paths of the flanges have been clearly visible, and this has been due to the fact that the pores of the metal deposited or left in the molten glass molecules of air or gas which expanded into minute bubbles producing milk-like streaks, in which there may usually be discerned bubbles of larger size. I have demonstrated, however, that if a very dense, smooth metal be employed for these embedding flanges, or for surfacing the same, then this difficulty is wholly eliminated.

An important and essential feature of the invention resides in maintaining a reliable and controlled feeding-in of the wire mesh. As shown more clearly in the drawing, the wire mesh 9 is fed in in advance of the embedding roll, and I have found that it is important that the wire be kept in close, firm contact with the edges of the embedding flanges from a point where the wire encounters the ball or pour of glass, around to the point where the flanges leave it properly placed. To secure this maintained and close contact with the flanges the wire must be kept under accurate control and not allowed to descend loosely. Furthermore, it is important that the wire be kept laterally spread out in a straight line across its full width, and preferably kept taut under more or less tension. To accomplish this control of the wire, I have devised special feeding devices which I will now describe.

The wire is arranged to pass from any suitable source of supply, as for example from a table-like chute 12 whereon it is initially laid in suitable lengths, to and though a pair of tension rollers 13, 14, thence past and in peripheral contact with a stretching-out roll 15 of special construction which operates to distend the wire laterally with a gentle or slight but continuous tension, and thence beneath the main roll. The tension rolls 13 and 14 may have smooth, cylindric peripheries, and they are journaled parallel with each other; the lower roll being mounted in substantially fixed lower journals 16 and the upper roll having its trunnions 17 confined in forks 18 which are of such depth as to let the periphery of the roll ride with its full weight upon the lower roll. It follows that when the wire is passed between these rolls the weight of the upper one produces a tension upon the wire, and this tension (which need not be great) may be increased if desired by placing added weights or springs upon the extended trunnions of the upper roll. The stretching roll is journaled in fixed journals, as indicated at 19, and its periphery is formed into two oppositely pitched prominent screw-threaded or spirally corrugated portions, as 20, 20', each of which covers half the length of the roll so that the two meet at the center of the latter. The wire, in being drawn past this stretching r ., rotates the latter, and the direction of pitch of the two threaded portions is such as to effect a spreading action upon the wire and stretch it from edge to edge. It will be noted that the location of the spreading roll is such with reference to the front side of the main roll that the wire is held in contact with the latter to a point above that reached by the ball of glass. Furthermore, the lateral spreading tension will be to an extent controlled and effected by the longitudinal tension.

Another feature of the apparatus which contributes to the reliability and success of the method is the provision of means whereby the pouring or dumping of the glass upon the table may be gradual and continued throughout the chief part of the spreading operation, thereby enabling the ladleman to keep a relatively small but sufficient quantity of glass in front of the roll at all times during the forming of the sheet. For this purpose a pair of supporting bars 21, 22, are mounted parallel with, and in advance of, the main roll in such position that they together form a cradle-like support upon which the ladle 23 may be rested and slid back and forth while pouring. The use of this kind of a support with a ladle enables the workman to continue the pouring as long as desired, and to distribute the pour very evenly across the entire width necessary to form the sheet; this being accomplished by sliding the ladle back and forth while in its pouring position. There are several advantages inherent to this way of pouring, among which may be mentioned that the wire mesh passes through the glass for a comparatively short distance only before it is permanently placed in position; the pour of glass encounters but a relatively small portion of the periphery of the roll, and is therefore less rapidly cooled and, what is perhaps more important, tumbled or rolled less during the spreading operation; the pour may be larger than could be well accommodated by dumping the entire ladleful at once; the leading roll is not in contact with so large a mass of molten glass at any time and consequently is not heated to the same degree, and the workman is able to perform his work of pouring much more accurately and easily than is the case where the ladle is supported during the emptying of the same by sheer strength.

As hereinbefore stated, it is a feature of the present invention to so form the sheet of glass that each portion of the sheet as it is initially formed is given substantially its permanent formation. That is to say, it is not subsequently re-rolled or disturbed in such way as to re-distribute its mass or to disturb or displace the wire mesh placed therein. This condition will follow as a matter of course if the sheet is completed when the spreading and embedding roll passes over the sheet and the glass flows in and closes the cuts or openings by its own gravity and molecular attraction. However, when the sheet of glass is to be made more uniform as to its surface by rolling, I proceed as follows: I have discovered that one of the most important reasons for failing to successfully make high quality wire glass in accordance with the prior art single-pour processes was due to the use of such methods and apparatus as resulted in re-rolling and partly re-distributing the constituent parts of the sheet, after it had been first spread. A prime reason for failure of success heretofore has been, I think, due to the failure to take into account the fact that as soon as the pour of glass is dumped upon the table, and especially when it has been spread out across the table, the casting bed expands as to its upper surface under the action of the heat and assumes a distinctly crowning shape in transverse section. This crowning commences as soon as the glass is dumped but increases materially during the progress of the formation of the sheet. If, as has heretofore been customary, a straight cylindric roll be used to roll out and smooth the sheet it will, of course, be obvious that the sheet will be made thinner at the middle than at the edges thereof to the extent that the periphery of the roll and the bed of the table have been thrown out of parallelism by the expansive effect described. Inasmuch as the spreading roll passes over the bed of the table as fast as the ball of glass is spread, and is usually started very promptly after the pour has commenced, it follows that the crowning of the table beneath this roll is less than is the case with any roll or rolls which traverse the sheet after it has been spread. It is, however, appreciable even under the spreading roll, and if glass is to be made of uniform thickness from edge to edge it is necessary that the roll be correspondingly concave. Accordingly I prefer to make the combined spreading and embedding roll concave both as to its main body between the flanges and as to the edges of the flanges themselves. In practice I have found from three to five thirty-seconds of an inch smaller diameter at the center of the roll than at the acting ends thereof to be suitable.

When I use a smoothing roll, as for example as indicated at 24 in the drawings, this roll is made in conformity with the usual practice, except that it is made concave in axial section to an extent sufficient to compensate for the crowning of the table under the action of the spread-out sheet of glass. In practice I have found that from 4/32 to 6/32 of an inch smaller diameter at the center than at either end is suitable; assuming that the machine is of a size for making sheets of glass up to fifty inches in width. The smoothing roll 24 is mounted upon trangs or collars, the same as the leading roll, and it is important that its periphery be supported at a distance from the bed of the table almost or just equal to the mean thickness of the sheet of glass, so that it will press the surface of the glass and uniform the same without substantially disturbing the pre-formed mass of the sheet. Moreover, it is important that both the spreading and embedding operation, and the subsequent rolling-pressing operation (if the latter be employed) be performed in such manner as to avoid to the greatest practical extent any drawing, pulling or pushing effect upon the surface of the sheet. This means that the peripheral speed of these rollers must be adjusted with considerable nicety. If either of these rolls has a peripheral speed greater than the speed at which the bed is passing beneath it, relatively speaking, then the roll tends to draw through the roll-pass too much glass, thus producing a surplus of glass and wave-like effect in rear of the roll, while on the contrary, if the roll be rotating at a peripheral speed which is too slow as compared with the onward movement of the table, it will produce a dragging effect upon the surface of the sheet, which will not only make the latter uneven but, if severe enough, will show its effect in transverse cracks through the "skin" of the top surface. Moreover, the effects of improper peripheral speed in the case of the embedding roll, in addition to a tendency to displace the glass, also tends to buckle the wire netting in case the roll is rotated too fast, or to distort the meshes, softened by the heat of the glass, and stretch them out in case the roll is rotated too slowly. To obviate these objections I provide racks 25 along each side of the bed, and upon each of the several rolls provide gears fixed upon the rolls and which intermesh with these racks. In the drawings, 26 and 27 designate the gears of the leading and smoothing rolls, respectively. I prefer to provide a series of gears, graded in size for each of the several rolls, substituting one pair for another in adjusting each roll until I get the correct peripheral speed. To provide for further slight variations or adjustments of the peripheral speed, I make the rack 25 adjustable as to height; its teeth being so shaped that by raising or lowering the rack bodily the pitch line engagement between rack and gears will be changed, and the speed accordingly adjusted. The means of adjusting the rack vertically, shown in the present instance, comprises tap bolts 28 threaded vertically through the bed frame and engaging the under sides of the racks. To impart a still greater degree of smoothness to the glass, I sometimes employ one or more relatively light riding or floating rolls, as 29 and 30; these rolls being supported in journal forks or slots 31 and 32, in such manner that the weight of the rolls rests wholly upon the surface of the glass. The peripheries of these rolls are made concave to a degree accurately conforming to the concavity of the smoothing roll 24, so that the weight of the rolls will be distributed with approximate uniformity throughout the full width of the sheet. These rolls need not be controlled as to their peripheral speed, since the sheet has sufficient firmness to rotate them without distorting the surface.

It is important that the glass be very fluid, i. e. hot, at the time of pouring, in order that the glass shall readily flow into the spaces between the embedding flanges and accurately embed the netting without tending to distort the latter, and, perhaps more important still, flow together and close the cuts or openings in rear of the embedding roll. I have heretofore mentioned the importance of employing dense metal for the embedding flanges and surface of the collars, and I have found that if the glass be properly fluid, and the flanges of proper material and shape, and suitably smooth and clean, the cuts or openings caused by the entrance of the embedding flanges and the meshes of the wire will be entirely obliterated in so far as the interior of the sheet is concerned. It is further to be noted that rapidity of operation is important, and the closeness with which the smoothing roll follows the leading roll also contributes to the success of the operation. By rapidity of operation, excessive cooling of the glass is avoided, and corresponding overheating of the machinery. However, what has been said with reference to rapidity of operation, fluidity of the glass and compactness of the machinery applies much more emphatically to the making of thin glass than heavy glass. I have found that heavy glass may be made without any difficulty without operating more rapidly or using glass more fluid than that heretofore commonly used.

While I have herein shown an apparatus in which the leading roll is a combined spreading and embedding roll, and have described the method as carried out with this aparatus, yet I wish it distinctly understood that in the broader aspects of the invention the present method is employed where the sheet of glass is preliminarily spread by a roll which is closely followed by an embedding roll provided with suitable flanges. In such case the leading roll serves merely to effect a preliminary spreading of the glass. In this modification of the method, as in that previously described, the important thing is to maintain the netting under proper control as it is being inset or rolled-in, so that it enters the sheet and is deposited in a substantially undeviating plane, and the avoidance of any substantial re-formation or re-distribution of the mass of the sheet after the wire has been inset. So also the importance of employing rolls to conform to the expanded shape of the table is, if anything, greater in this instance, because there is a slightly longer interval of time for the heat of the glass to act upon the apparatus.

While the apparatus described is in part specially designed to carry into effect my improved process, yet it is, of course, understood that the invention may be practiced with the aid of apparatus otherwise constructed.

I claim as my invention:

1. An improved single-pour process of making wire glass, which consists in rolling out a single layer full-thickness sheet of glass, progressively and by the use of smooth, dense-surfaced, means, dividing one side of said sheet by a series of cuts narrow relatively to their depth, whereby the glass readily flows back and closes them, said cuts extending to a uniform depth and but partially through the sheet, and simultaneously, as the formation of said cuts proceeds, feeding beneath said cutting means a sheet of wire netting under maintained control and guidance, and held against response to flowing movements of the glass until it has been positively directed to and placed within, those parts of the sheet wherein the sheet-spreading formative action has been completed, thereby depositing the netting in a substantially undeviating plane parallel with the surface of the sheet and coincident with the bottom of said cuts, and completing said sheet by effecting the closing of said cuts without disturbing the placed netting and without respreading or effecting flowing or mass movements of the intact half of the sheet.

2. An improved single-pour process of making wire glass, which consists in spreading out a full-thickness sheet of glass and progressively inserting into one side thereof a sheet of wire netting maintained under positive control and guidance, mechanically held taut both laterally and lengthwise, and held against response to flowing movements of the glass until it has been positively directed to, and placed within, those parts of the sheet wherein the sheet spreading formative action has been finally completed and the netting deposited therein in a substantially undeviating and subsequently-undisturbed plane.

3. An improved single-pour process of making wire glass, which consists in progressively spreading out a full-thickness sheet of glass, concurrently and progressively insetting into one side thereof a sheet of wire netting under such control and guidance that it is not free to respond to flowing movements of the mass of glass but is directed into placement and deposited in a substantially undeviating plane remote from, and to all practical intents parallel with, the surfaces of the sheet, and progressively pressing the wire-inset sheet between a roller and an opposed surface, the acting faces of which pressing devices are maintained substantially in accurate parallelism and at a distance apart substantially that of the mean thickness of the pre-formed part of the sheet, whereby said pressing is effected without substantial redistribution of the mass after its initial formation and without substantially disturbing the netting.

4. An improved single-pour process of making wire glass, which consists in rolling out a full-thickness sheet of glass and progressively and simultaneously embedding a sheet of wire netting therein, by forcing the wire into and below the surface of the sheet to a uniform depth by the use of means forming cuts narrow relatively to their depth and having smooth, dense surfaces, practically non-absorbent and free from occluded gas, whereby the insetting is accomplished without contamination of the glass.

5. A method of making single-pour wire glass, which consists in pouring a mass of molten glass upon a flat forming surface, reducing the mass to sheet form and concurrently, as a progressive operation, feeding a sheet of wire netting under maintained tension past guiding means which extend into the mid-plane of the formed part of the sheet and positively direct the netting to, and thereby deposit it in, its final plane, said guiding means forming cuts narrow relatively to their depth and having smooth, dense, surfaces substantially free from gases.

CLEMENT J. JUNGERS.

Witnesses:
ALBERT H. GRAVES,
EMILIE ROSE.